(12) United States Patent
Smith et al.

(10) Patent No.: US 7,140,544 B2
(45) Date of Patent: Nov. 28, 2006

(54) THREE DIMENSIONAL VISION DEVICE AND METHOD, AND STRUCTURED LIGHT BAR-CODE PATTERNS FOR USE IN THE SAME

(75) Inventors: Warren D. Smith, Plainsboro, NJ (US); Sebastien Roy, Montreal (CA)

(73) Assignee: NEC Laboratories America, Inc., Princeton, NJ (US)

(*) Notice: Subject to any disclaimer, the term of this patent is extended or adjusted under 35 U.S.C. 154(b) by 461 days.

(21) Appl. No.: 10/657,046

(22) Filed: Sep. 5, 2003

(65) Prior Publication Data
US 2004/0041028 A1    Mar. 4, 2004

Related U.S. Application Data

(63) Continuation of application No. 09/963,162, filed on Sep. 26, 2001, now Pat. No. 6,634,552.

(51) Int. Cl.
*G06K 7/10* (2006.01)
*G06K 15/12* (2006.01)

(52) U.S. Cl. .................. 235/462.01; 235/462.41; 356/610

(58) Field of Classification Search ........ 356/601, 356/603, 606, 610, 616, 62; 235/462.01, 235/462.41; 382/183, 285
See application file for complete search history.

(56) References Cited

U.S. PATENT DOCUMENTS

| | | | | |
|---|---|---|---|---|
| 4,335,962 A | * | 6/1982 | Di Matteo et al. | 356/604 |
| 4,634,278 A | * | 1/1987 | Ross et al. | 356/610 |
| 4,653,104 A | * | 3/1987 | Tamura | 382/154 |
| 4,668,984 A | * | 5/1987 | Rosenfeld | 348/136 |
| 4,815,918 A | * | 3/1989 | Bennett et al. | 414/401 |
| RE32,984 E | * | 7/1989 | Rosenfeld | 348/136 |
| 5,135,308 A | * | 8/1992 | Kuchel | 356/604 |
| 5,135,309 A | * | 8/1992 | Kuchel et al. | 356/604 |
| 5,621,529 A | * | 4/1997 | Gordon et al. | 356/604 |
| 5,971,276 A | | 10/1999 | Sano et al. | |
| 5,986,745 A | * | 11/1999 | Hermary et al. | 356/3.03 |
| 6,229,913 B1 | * | 5/2001 | Nayar et al. | 382/154 |
| 6,262,803 B1 | * | 7/2001 | Hallerman et al. | 356/603 |
| 6,291,817 B1 | * | 9/2001 | Kobayashi et al. | 250/237 G |
| 6,328,211 B1 | | 12/2001 | Wilz et al. | |
| 6,341,016 B1 | * | 1/2002 | Malione | 356/603 |
| 6,495,848 B1 | * | 12/2002 | Rubbert | 250/559.22 |

(Continued)

FOREIGN PATENT DOCUMENTS

JP    02105986 A    4/1990

OTHER PUBLICATIONS

Recent Progress in Coded Structured Light as a Technique to Solve the Correspondence Problem: A Survey, J. Battle, et al., Pattern Recognition, vol. 31, No. 7, pp. 963-982.

(Continued)

*Primary Examiner*—Daniel Walsh
(74) *Attorney, Agent, or Firm*—Scully, Scott, Murphy & Presser, P.C.

(57) ABSTRACT

The present invention is a system and method for three dimensional machine vision including a projector and camera. The projector casts a structured light Quadratic Residue Bar Code on the surface to be mapped. The camera then images the surface. The projected image is shifted, and the process is repeated a number of times, according to the particular arrangement selected for the structured light Quadratic Residue Bar Code. The image data collected from this series of images is then processed by relatively simple matrix operations to determine the location of each camera pixel in three dimensional space.

28 Claims, 6 Drawing Sheets

U.S. PATENT DOCUMENTS

| | | | |
|---|---|---|---|
| 6,549,289 B1* | 4/2003 | Ellis | 356/603 |
| 6,556,783 B1* | 4/2003 | Gelphman | 396/20 |
| 6,728,423 B1* | 4/2004 | Rubbert et al. | 382/294 |
| 6,744,932 B1* | 6/2004 | Rubbert et al. | 382/294 |
| 6,751,344 B1* | 6/2004 | Grumbine | 382/154 |
| 7,013,040 B1* | 3/2006 | Shiratani | 382/154 |
| 2002/0018219 A1* | 2/2002 | Hallerman et al. | 356/604 |
| 2004/0018219 A1* | 1/2004 | Mateu et al. | 424/401 |
| 2004/0032974 A1* | 2/2004 | Kriesel | 382/110 |
| 2004/0246495 A1* | 12/2004 | Abe | 356/603 |
| 2004/0246496 A1* | 12/2004 | Yoshida | 356/605 |
| 2004/0263783 A1* | 12/2004 | Neal et al. | 351/221 |
| 2005/0088656 A1* | 4/2005 | Soga et al. | 356/444 |
| 2005/0197587 A1* | 9/2005 | Rudy et al. | 600/509 |
| 2006/0007450 A1* | 1/2006 | Cantin et al. | 356/605 |
| 2006/0012802 A1* | 1/2006 | Shirley | 356/603 |
| 2006/0093206 A1* | 5/2006 | Rubbert et al. | 382/154 |
| 2006/0103854 A1* | 5/2006 | Franke et al. | 356/603 |
| 2006/0132802 A1* | 6/2006 | Chung et al. | 356/603 |

OTHER PUBLICATIONS

"Matrix Computations", G.H Golub, et al., Third Edition, John Hopkins University Press 1996, pp. 236-237.

"A Classical Introduction to Modern Number Theory" K. Ireland, et al., Second Edition, Springer-Verlag, 1990, pp. 50-79.

"On Orthogonal Matrics," R.E.A.C. Paley Journal of Mathematical Physics, pp. 311-320, 1933.

* cited by examiner

THREE DIMENSIONAL VISION DEVICE AND METHOD, AND STRUCTURED LIGHT BAR-CODE PATTERNS FOR USE IN THE SAME

CROSS-REFERENCE TO RELATED APPLICATIONS

This application is a continuation of U.S. patent application Ser. No. 09/963,162, filed 26 Sep. 2001 now U.S. Pat. No. 6,634,552, the complete disclosure of which is hereby incorporated by reference for all purposes.

BACKGROUND OF THE INVENTION

1. Field of Invention

The invention relates generally to the field of three dimensional machine vision, and more particularly, it relates to a three dimensional vision device and method for mapping a three dimensional surface faster and more accurately than previously thought feasible. In addition the invention relates to a structured light bar code pattern for use in the three dimensional vision device and method.

2. Description of Related Art

Previous machine vision techniques, for example those used to map a three dimensional surface, have typically attempted to employ a stereoscopic system in one of two classes. The first class includes systems that combine the images from two cameras some finite distance apart, mimicking human vision.

The second class includes systems that comprise a projector and camera arrangement, again some distance apart, where the projector casts a structured light image onto the surface to be mapped, and the camera images the surface. The deformation of the structured light image from the point of view of the camera is caused by the contour of the surface. From these deformations, the position of the surface in three dimensional space can be calculated.

Both classes of machine vision have difficulty in reconciling the two points of view into information about the third dimension. For example, in the case of a two-camera system, it is difficult to determine the correspondence between the two images. To solve this problem, feature recognition algorithms have been developed which can, with some degree of success, identify and match corresponding features of the two images. These algorithms, however, typically produce errors of at least ±1 pixel, which may be acceptable for some applications, but not for all. This scheme also cannot work for a featureless three dimensional surface.

For projector-camera systems, the problem of determining correspondence between a given projected pixel and its image on the three dimensional surface also exists. Previous systems using structured light suffered because extraneous light "noise" from nearby camera pixels compromised the data, since the light on adjacent pixels is closely correlated (for example, sine wave grayscale). Structured light in two dimensional patterns such as uniform grids require the same feature recognition of the two camera systems to locate the grid vertices, resulting in pixel errors. Further, as will be shown, only one dimensional structured light is required, given a two dimensional camera, to accurately locate the position of the mapped surface in three dimensional space. The second dimension of the light pattern is superfluous.

In addition, for most of the prior art systems sub-pixel resolution has proven difficult or impossible.

A full discussion of various Prior Art systems can be found in Battle, et al., *Recent Progress in Coded Structured Light as a Technique to Solve the Correspondence Problem: A Survey,* 7 Pattern Recognition 963, 963–982 (1998).

BRIEF SUMMARY OF THE INVENTION

It is an object of the present invention to provide a system and method of accurately mapping a three dimensional surface which overcomes the deficiencies of the prior art.

Specifically, it is an object of the present invention to provide a system and method of accurately mapping a three dimensional surface which is immune to the effects of "noise" from nearby pixels.

It is another object of the present invention to provide a system and method of accurately mapping a three dimensional surface which enables the use of simple and efficient calculation techniques.

It is another object of the present invention to provide a system and method of accurately mapping a three dimensional surface which can quickly perform the mapping function.

It is another object of the present invention to provide a system and method of accurately mapping a three dimensional surface which can achieve accurate sub-pixel resolution.

It is another object of the present invention to provide a system and method of accurately mapping a three dimensional surface which enables the use of common components for both projection and image capture.

It is another object of the present invention to provide a system and method of accurately mapping a three dimensional surface which can be economically mass-produced for commercial exploitation.

It is another object of the present invention to provide a structured light bar code pattern that enables the above objects to be achieved.

The system of the present invention comprises a projector and camera. The projector casts an image of structured light on the surface to be mapped. The structured light is a bar code, having bars of equal width, each light or dark according to a quadratic residue formula. The structured light may be created passively, as with a mask, or actively, as with a laser emitter and rotating polygon mirror. The camera then images the surface. The projected image is shifted, and the process is repeated a number of times, according to the particular arrangement selected for the structured light. The image data collected from this series of images is then processed to determine the correspondence of each camera pixel to the bar of the structured light that overlays the scene at each pixel. Knowing this correspondence, the location of the image within each camera pixel in three dimensional space can be triangulated, even to sub-pixel accuracy.

BRIEF DESCRIPTION OF THE DRAWINGS

These and other features, aspects and advantages of the system and methods of the present invention will be apparent from the following description, drawings and appended claims, where like numerals indicate like elements across the various views:

FIG. 1(*b*) shows a more detailed view of the components of the system, with certain elements omitted for clarity.

DETAILED DESCRIPTION OF THE INVENTION

Figure 1A:
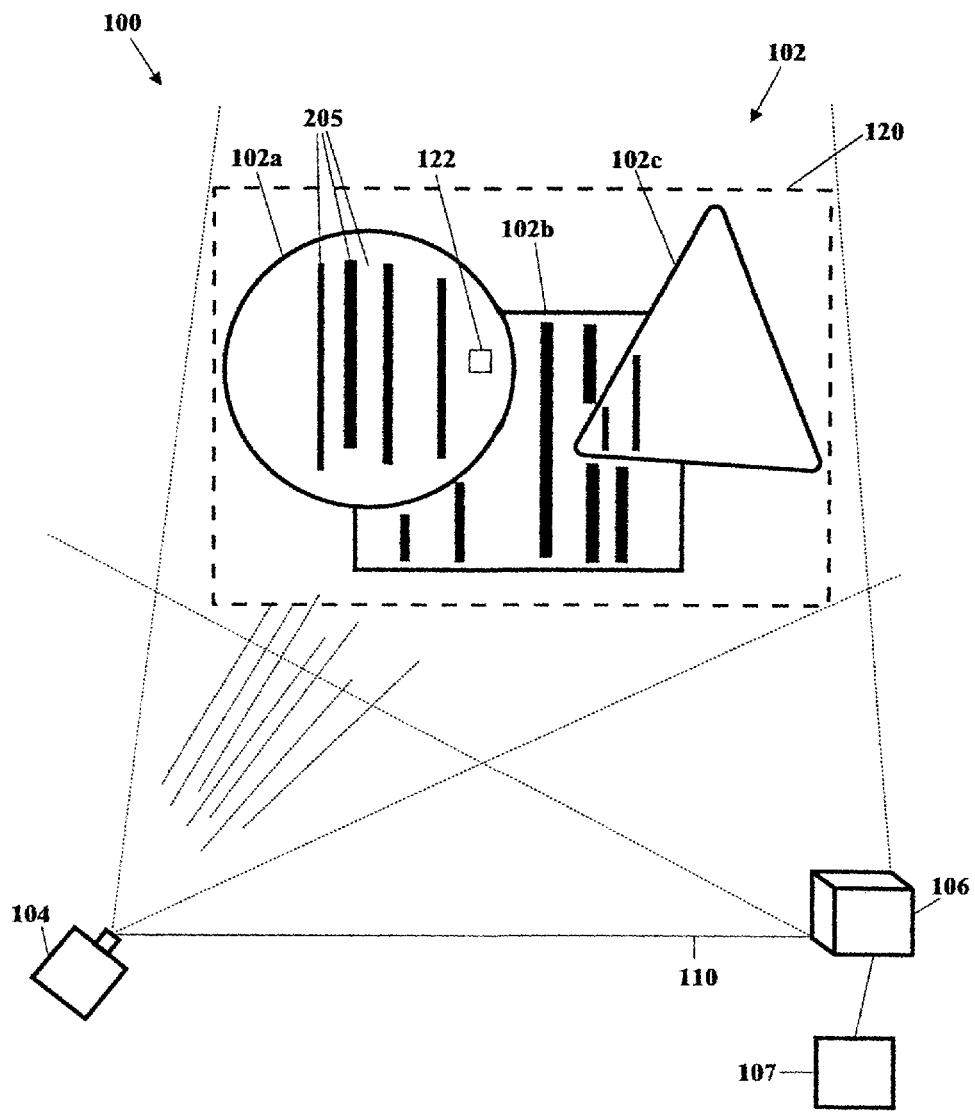
FIG. 1(*a*) schematically shows the basic components arranged according to the system of the present invention.

Referring to FIG. 1(a) in an exemplary embodiment of the invention, a system 100 for mapping a three dimensional surface 102, comprises a projector 104 and a monochrome digital pixel camera 106. Here, the surface 102 is comprised of a spherical object 102a, a rectangular object 102b, and a tetrahedral object 102c. The projector 104 casts light and dark bars 205 onto the surface 102. Bars 205 are shown parallel in this schematic figure, however in practice these will appear altered due to the contours of surface 102. In fact, these alterations are crucial to machine vision systems of this class.

Both the projector 104 and the camera 106 are located some fixed distance from the surface 102, as well as some fixed distance from each other, along line 110. Camera 106 is comprised of an array of pixels 108 (see FIG. 1B), and shall have some finite field of view 120. Camera 106 is oriented such that the surface 102 falls within its field of view 120. Each pixel 108 shall have some pixel field 122 within the larger field of view 120 of camera 106. Pixel field 122 defines the extent to which pixel 108 may take an image. A computer 107 or some equivalent means for processing the image data to be collected by the camera 106 is also part of the system 100.

Figure 1B:
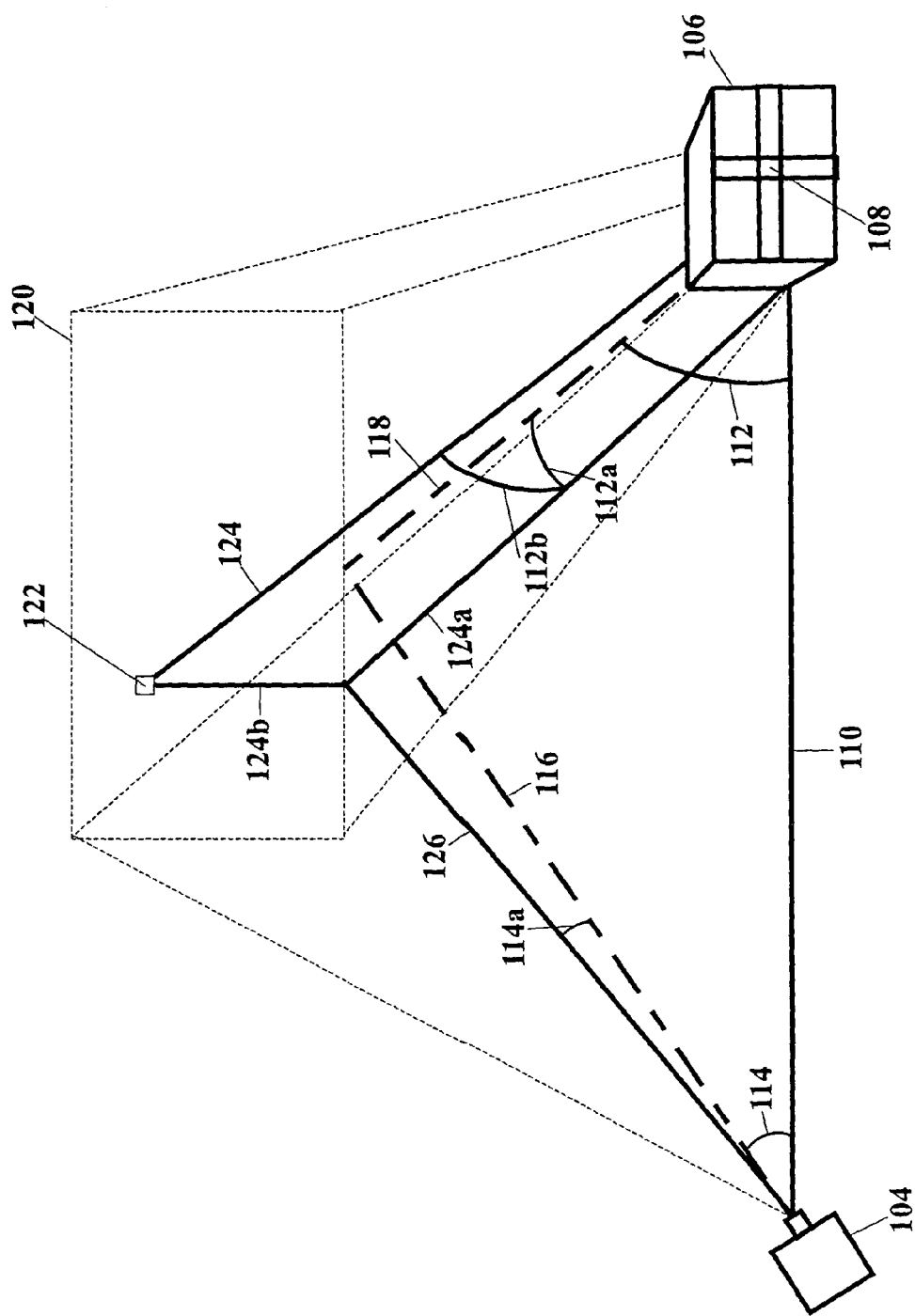

Referring now to FIG. 1(B), the camera axis 118 of camera 106 makes some angle 112 with line 110. Similarly, the center axis 116 of projector 104 makes some angle 114 with line 110.

Line 124 connects pixel field 122 with pixel 108. Lines 124a and 124b are orthogonal projections of line 124, for the purpose of locating pixel field 122 in three dimensional space. Lines 124a and 124b make angles 112a and 112b, respectively, with camera axis 118. Line 126 is an orthogonal projection of a bars 205 (see, FIG. 1(A)) that falls within pixel field 122, and line 126 makes an angle 114a with center axis 116.

Figure 2:
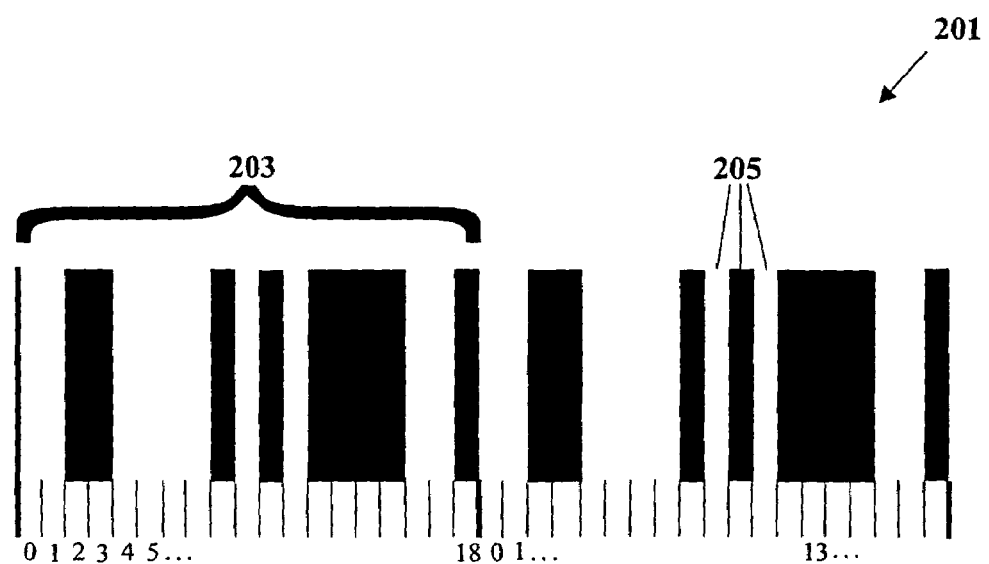
FIG. 2 shows an example of the structured light bar code according to the present invention, having a period of 19 pixels.

FIG. 2 shows an exemplary embodiment of the structured light bar code of the present invention. Bar code 201 has a repeating period 203, and is comprised of a number, p, of bars 205. Each bar 205 is a vertical bar of uniform width, preferably approximately equal to the width of one pixel field 122 at the surface 102.

To successfully calculate the correspondence between a given bar 205 and the pixel field 122 where it was located at the beginning of the process, preferably p is larger than the disparity between the projector 104 and the camera 106. Disparity is defined as number of pixels of displacement observed between the image obtained by the camera 106 and the image displayed by the projector 104. For example, if the ninth projected bar 205, counting laterally, in a period 203 appears to the camera to be the fifth imaged pixel, again laterally, the disparity is said to be 4. If p is smaller than the expected disparity range, the method will result in some correspondence ambiguity. This ambiguity can be removed using a "phase unwrapping" system, which is well known in the prior art. However selection of sufficiently large p, subject to limitations described below, obviates ambiguity and the need to resolve it.

The number p will determine the number of images to be processed. Larger values of p have certain advantages, including the ability to permit greater disparity between the camera and projector, which in turn allows greater flexibility in locating both camera 106 and projector 104. However, this gain must be balanced against the time required to capture the images and process the data.

For the exemplary bar code pattern shown in FIG. 2, p is 19. The bars 205 of bar code 201 are indexed, i, from zero through p−1. Each $i^{th}$ bar 205, is assigned a value of either 1 or −1 according to the pseudocode:

for(i=0; i<=p; i++) Jacobi[i]=−1;

for(i=0; i<p; i++) Jacobi[(i*i) mod p]=1;

Bars assigned a value of 1 are light, and those assigned a value of −1 are dark. In other terms, if the index of a particular bar is equal to the remainder of some perfect square divided by p, the bar is light; otherwise it is dark. The pattern that results is a Quadratic Residue (QR) Bar Code. This formula has been shown effective for the set of prime numbers fitting the equation p=4m−1, where m is a positive integer. Another pattern exists for p=15 (++++−+−++−−+−−−) that, while this is not a QR Bar Code, exhibits the orthogonal properties that enable the method of the present invention.

The method of mapping a three dimensional surface according to the present invention will now be described.

Beginning at some time to, the surface 102 to be mapped is illuminated with the structured light bar code 201. The digital pixel camera 106 photographs the surface 102, and the light intensity of each camera pixel 108 is recorded as data in matrix form. The structured light bar code 201 then shifts the width of one bar 205 across the surface 102 to be mapped. With the structured light in its new position, now time t1, the digital pixel camera 106 again photographs the surface 102, and again records the light intensity of each camera pixel 108 in matrix form. This process is repeated for times t2, t3 . . . t(p−1). An additional picture is taken at time t(p) while the structured light bar code 201 does not illuminate the surface 102 (all-dark). Alternately, this all-dark state image may be simulated by inputting, for each camera pixel 108, the maximally dark the value of that camera pixel 108 among the images previously captured.

The resulting data can be arranged in a three dimensional matrix having dimensions of x, y, and time (t). At each point in the matrix, there is some grayscale value. When taken in combination with the all-dark image data, it is a property of the QR bar code 201, and of the specific 15-bar pattern noted, supra, that the data vector along the t direction at each pixel will invariably be some pattern corresponding uniquely to only one of p bars 205 in the QR bar code. This data vector is the time-series fingerprint of that bar 205. Further, each data vector will be mutually orthogonal to every other data vector within p pixels 108.

The data vector is then pre-processed for each pixel by shifting the data such that the mean value across p images at each pixel is equal to zero, according to the pseudocode:

sum=0.0;

for(i=p; i>=0; i−−){sum+=grey[i]; } avg=sum/(p+1);
For(i=p; i>=0; i--){myvec[i]=grey[i]-avg; }

Values are then scaled. A variety of scaling methods known to those skilled in the art are suitable. In the exemplary embodiment, the mean square of the values was scaled to equal one, according to the pseudocode:

```
sqsum = 0.0;
for(i=p; i>=0; i--){x = myvec[i]; sqsum += x*x;}
meansq = sqsum/(p+1);
rms = sqrt(meansq);
if(rms>0.0) {
    reciprms = 1.0/rms
    for(i=p; i>=0; i--){myvec[i] *= reciprms; }
}
```

The shift is done to mathematically compensate for image effects extraneous to the QR bar code itself. Such effects include ambient light, light noise, and/or variances in brightness and contrast of the projected image, among others. The scaling mathematically enhances the contrast between the light and dark states of the camera pixel 108.

To determine the correspondence of a particular camera pixel 108 to bar 205 of bar code 201 that was located at pixel field 122 at time t0, consider the vector formed by the data at that pixel as some function F(t). Owing to the mutually orthogonal properties of the bar code 201, each projector bar 205 will exhibit this unique time-series fingerprint that is orthogonal to each other bar 205 in the period 203. In accordance with this property, the inner product of each QR bar time-series fingerprint, function G(t), and all but the correctly corresponding pixel vector F(t) will be zero. Simultaneously, the inner product with the correctly corresponding vector will be large. The inner product is calculated according to the function:

$$\langle G(t), F(t) \rangle = \sum_{t=0}^{p} G(t)F(t)$$

This is executed according to the pseudocode:

```
maxdot = -infinity;
for(j=0; j<p; j++){
    s=0.0;
    for(i=p; i>=0; i--){
        s += myvec[i] * Jacobi[i];
    }
    dotprod[j] = s;
    if(maxdot<s){maxdot = s; bestj = j; }
}
```

The resulting value of bestj is the index of the corresponding bar 205. This process requires $p^2$ iterations, and dominates the time over everything else in the method. The process may be optimized with the use of Fast Fourier Transform (FFT) based algorithms to compute the data in less than the $p^2$ number of iterations contemplated, as few as O(p log p). However, the gains in speed from using the FFT would only be significant for large values of p.

This gives us resolution to the pixel level. However, the method is robust enough to provide resolution as small as 0.01 pixels. As will frequently be the case, camera pixels and projector bars may not directly coincide. In this case, some portion f of the camera pixel lies under a particular bar 205, and some portion 1-f under another. Then the following pseudocode can compute f:

```
maxdot = -infinity;
for(j=0; j<p; j++){
    x = dotprod[j];
    if(x<0.0) x = 0.0;
    score[j] = x*x;
}
x = score[p-1];
for(j=0; j<p; j++){
    z = score[j];
    score[j] += x;
    x = z;
    if(maxscore<score[j]) {
        maxscore = score [j];
        bestj = j;
        a = dotprod[j]
        b = dotprod[(p+j-1)%p];
    }
}
```

The camera pixel under investigation is a combination of pixels bestj and bestj−1, weighted a/(a+b) and b/(a+b), respectively.

Similarly, if surface 102 is such that a given pixel field 122 includes parts of three bars, the relative weightings a, b, and c can be determined, subject to the constraint a+b+c=1. If a given pixel field 122 includes an edge, the pixel may include images from two non-adjacent bars. Removing the constraint of adjacency, precisely which two bars fall within a given pixel field 122, and in which proportions they do so, can be determined.

Projector angle 114 is measured relative to some central axis 116 of the projector 104. A given bar 205 will be located some angle 114a away from central axis 116. For some known bar 205, the angle it makes with line 110 will also be known. Similarly, camera angle 112 is measured with respect to the camera axis 118 of that camera 106. A given camera pixel 108 will be some angle 112a lateral to the camera axis 118, and some other angle 112b vertical to the camera axis 118. Similarly, one can deduce the precise angle of a given camera pixel relative to line 110.

Once it is established that a given camera pixel 108 corresponds to a given bar 205, the known distance of line 110 and the angle that the camera pixel 108 and bar 205 each make with that line 110 can be used to simply and quickly triangulate the position of the image appearing in pixel field 122 in three dimensional space. Further, knowing the position of the bar 205 to a sub-pixel accuracy increases the accuracy to which this location is known.

Data that results from using the Quadratic Residue Bar Code has several advantages. By combination with the last 'all-dark' image, that data is made orthogonal to any circular shift of itself. This property also exists in the 15-bar pattern noted above. One advantage of this is optimal immunity from the influence of light "noise". Pixels less than p away from a given camera pixel 108 under investigation will each have data which is orthogonal to that of said given camera pixel. As has been shown, the inner product of that orthogonal data will be zero, while the inner product for the correct pixel will be large, making it simple to determine correspondence. It is this feature of orthogonality that also makes accurate resolution at the sub-pixel level possible.

The present invention also overcomes previously encountered difficulties in calibrating the transfer function of the camera/projector system. In prior art systems, particularly structured light schemes including a variety of gray scale patterns (e.g., saw-tooth, triangle, sine wave), the problem of calibration due to non-linearity of the transfer function between the camera and projector has been significant. For example, if a camera pixel is illuminated by light at 50% of maximum intensity, the intensity value at the corresponding camera pixel may not be precisely 50% of the intensity of those camera pixels illuminated by 100% intensity light. Similarly, a projector almost never illuminates the whole scene uniformly, creating another source of non-linearity. Thus, such systems require calibration that is both time-consuming and difficult. In the current system, there are only two values of light intensity to discriminate between. Further the data is shifted and scaled in pre-processing to enhance the contrast between these two values. Calibration becomes either trivial or unnecessary.

Another advantage of orthogonality is the effect of simplifying the calculations. Since the inverse of an orthogonal matrix is simply its transpose, complex matrix inversion is rendered unnecessary.

Figure 3:
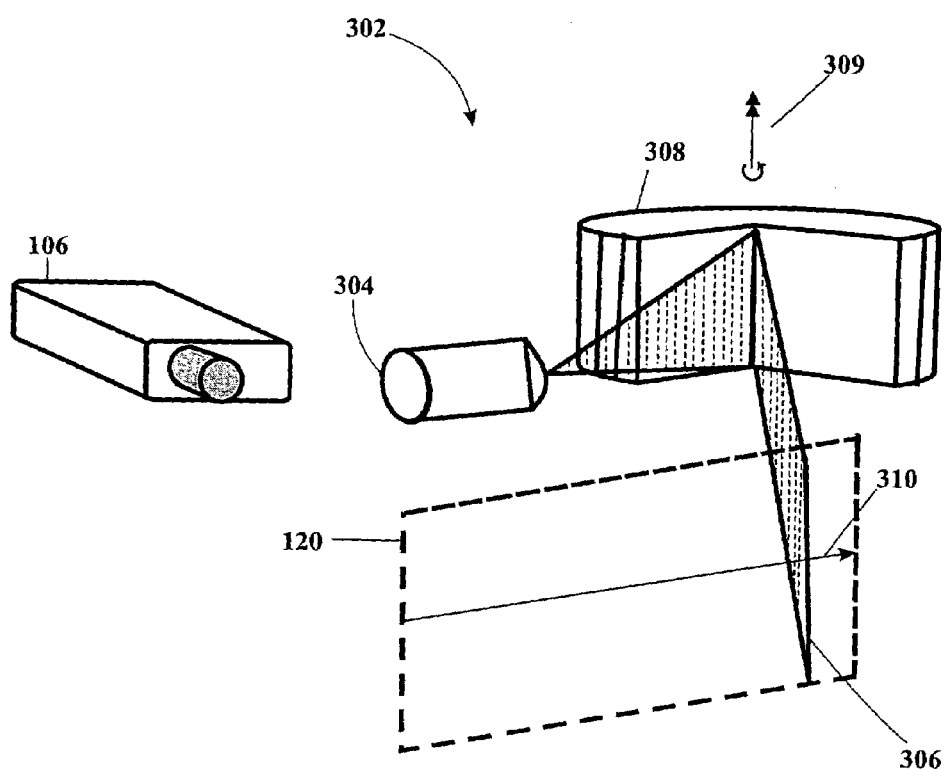
FIG. 3 shows an embodiment of the projector, where the structured light bar code is created using a laser emitter and rotating mirror.

Another advantage of the present invention is that each bar code image is a cyclical shift of itself. This lends itself to various means of practicing the method. In FIG. 3 an active projection means 302 alters the pattern for each image. One embodiment would include a laser projector 304 emitting a 'sheet of light' 306 against a rotating polygonal reflecting surface 308, rotating in the direction indicated by arrow 309. Sheet of light 306 sweeps across the field of view 120 of camera 106, in the direction of arrow 310. High precision is possible through the high accuracy capable in timing the laser modulation, the thinness of the light sheet, and the high constancy of the angular momentum of rotating mirror 308 between the moments when its position was precisely known. As a more sophisticated second order approximation, the mirror could be assumed to have constant angular acceleration and deceleration rather than constant angular momentum.

Figure 4:
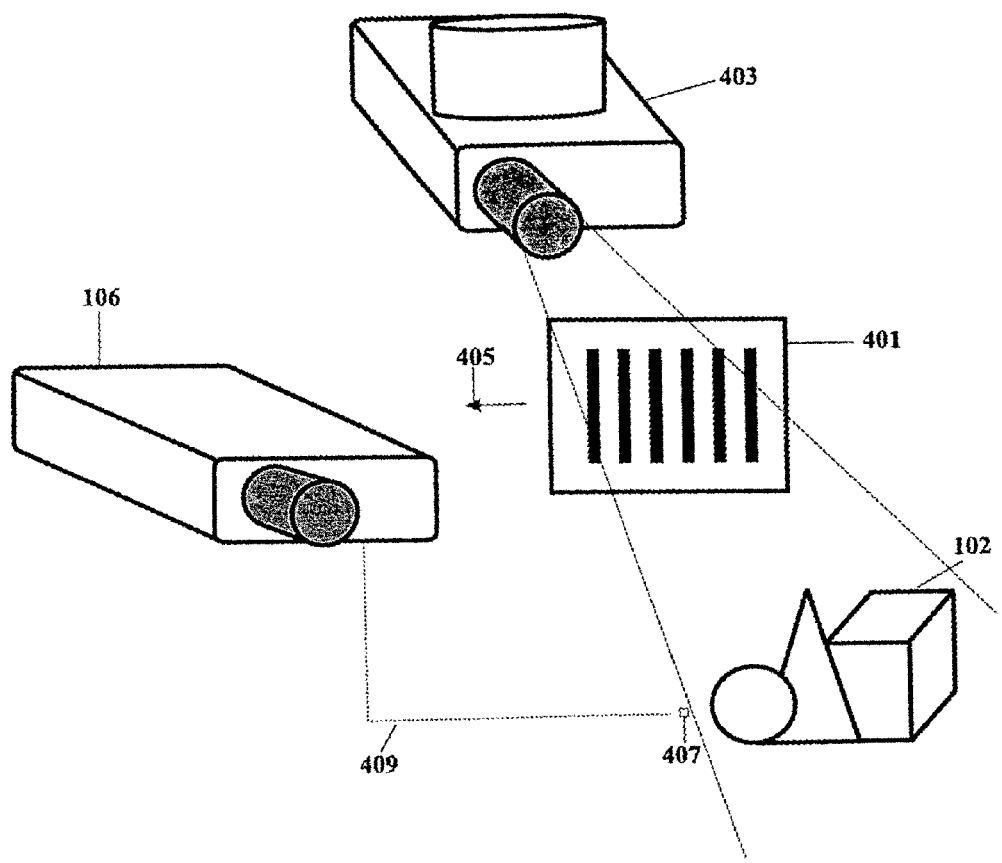
FIG. 4 shows an alternate embodiment of the projector, where the structured light bar code is created using a projector and a chrome-on-glass mask.

As an alternative, cyclical shift of the bar code can be created by a passive means, as shown in FIG. 4. A high precision chrome-on-glass mask 401, placed for example in front of projector 403, would create the bar code. The mask 401 is then moved in the direction of arrow 405, shifting over the surface 102. One or more pinhole photodiodes 407 can detect when the image is in the proper position and trigger the camera 106 via link 409.

Figure 5:
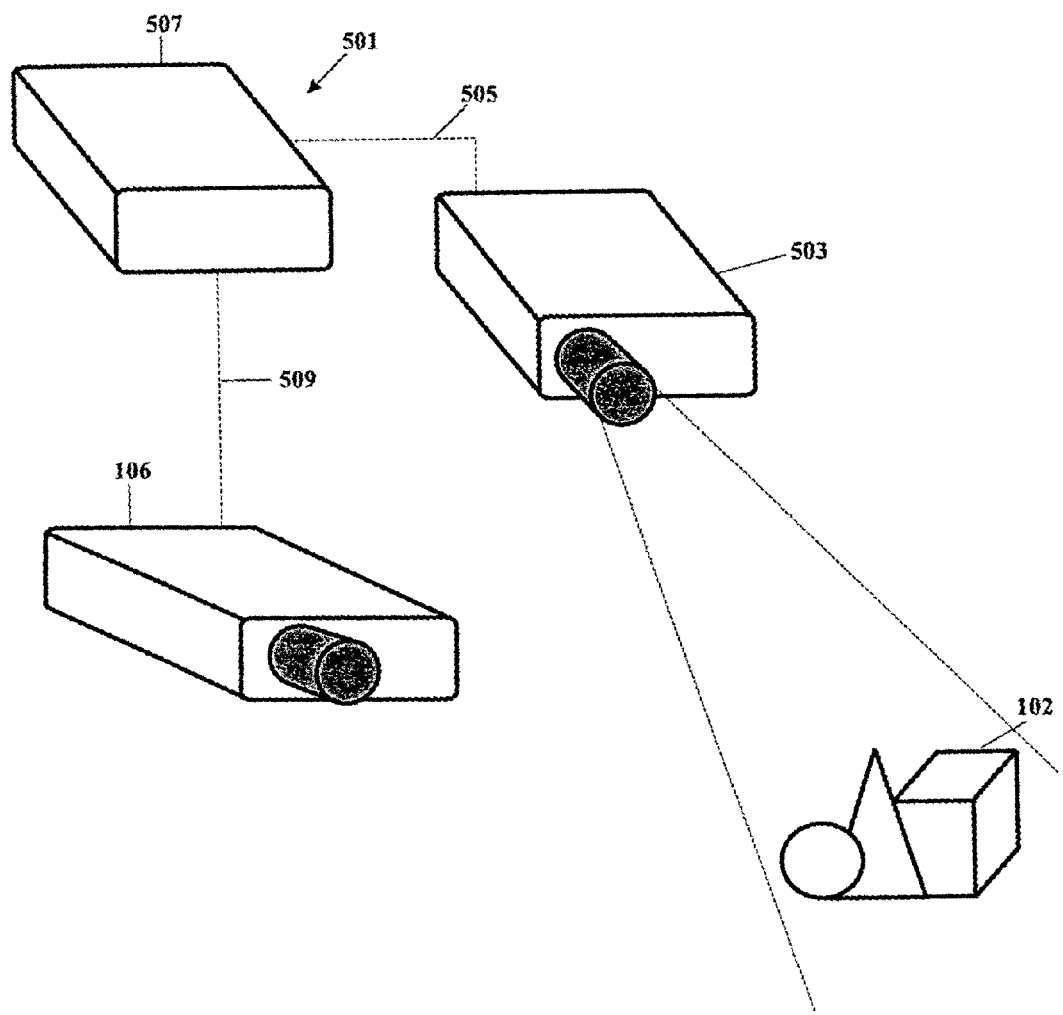
FIG. 5 shows an alternate embodiment of the projection system, where a video signal generator sends video signals to an active projector for generating the structured light bar code.

In yet another embodiment of the projection system shown in FIG. 5, a video signal generator 501, such as a computer 507 or similar device, transmits video signals directly to an active projector 503 via link 505. When using a computer as the video signal generator 501, this computer can be programmed to both generate the bar code video signal and collect the data from camera 106, thereby performing the function earlier assigned to the computer 107. When employing a computer 507 to both generate the bar code video signal and collect the image data, the computer 507 would also trigger the camera to collect the image via link 509.

Some commercially available digital pixel cameras, including the MOTIONSCOPE® line from Redlake MASD, Inc., are capable of image capture at frame rates up to 8000 per second. With the use of strobe lighting to ensure sufficient exposure during the digital shutter time, it is conceivable that the surface being mapped need not be at rest to achieve suitable accuracy.

Further, while the embodiment described above contemplates a monochrome camera, in a more general sense the invention could be used with a color camera and three colors of light, for example to compensate for the effects of the color of surface to be scanned.

Additionally, the structured light bar code is presented in only one dimension, as this is the minimum required for locating the surface in three dimensional space. One limitation of this is that sub-pixel accuracy can only be known along that single dimension. The bar code may be enhanced by adding second dimensionality, which would enable sub-pixel accuracy in both dimensions of the camera.

Relatively simple projector technology, readily available and inexpensive digital pixel camera technology, and a method that vastly simplifies the mathematics combine according to the present invention to create a system for imaging a three dimensional surface which can be produced economically and in large quantities for commercial purposes. The speed at which both the data can be captured and the image resolved are believed unparalleled in such a cost-effective platform.

Our invention has been described herein with reference to a particular exemplary embodiment. Certain alterations and modifications may be apparent to those skilled in the art, without departing from the scope of the invention. The exemplary embodiment is not meant to be limiting on the scope of the invention, which is defined by the appended claims.

The invention claimed is:

1. A system for mapping a surface comprising:
   a projection device operative to project a sequence of parallel bars, each of said bars having one of a first and second light values, wherein a vector representation of the order of said bars, supplemented by a value representing an additional bar, is mutually orthogonal to any circular shift of said order supplemented by a value representing an additional bar;
   means for generating an image of the surface; and
   means for processing the resulting image to map the surface.

2. The system according to claim 1, wherein each of said bars has substantially the same width.

3. The system according to claim 1, wherein said bars whose order in said sequence is equal to the remainder of a perfect square number divided by the number of said bars in each period have said first light value, and all other said bars have said second light value.

4. The system according to claim 1, wherein said sequence comprises a prime number p of bars according to the formula [p=4m−1], where m is a positive integer.

5. The system according to claim 4 wherein said prime number p is 19.

6. The system according to claim 1, wherein each of said bars has one of a first and second light value, according to the sequence:

++++-+-++--+--- where "+" represents the first light value and "−" represents the second light value, or any circular shift of said sequence.

7. A method of mapping a surface comprising the steps of:
   (a) projecting a bar code onto the surface to be mapped;
   (b) incrementally shifting said bar code over the surface a number of times equal to one less than the number of bars comprising said bar code;
   (c) imaging the surface for each position of said bar code, to collect data as to the light intensity of each of a plurality of pixels comprising said image; and
   (d) processing said collected data to determine the location in three dimensional space of the portion of the surface corresponding to each pixel.

8. The method according to claim 7, wherein the processing of the collected data includes the addition of data representing an image of the surface without said projected bar code.

9. The method according to claim 8 further comprising the step of imaging the surface to be mapped absent said projected bar code to form said additional data.

10. The method according to claim 8 further comprising the step of simulating a dark image to form said additional data.

11. The method according to claim 7 wherein the step of processing said collected data to determine the location in three dimensional space of the portion of the surface corresponding to each pixel further comprises:
(a) calculating the correspondence of each pixel to a respective one of said bars which comprise the bar code.

12. The method according to claim 7 wherein the step of processing said collected data to determine the location in three dimensional space of the portion of the surface corresponding to each pixel further comprises:
(a) processing said collected data to determine the proportion of each of a plurality of said bars which comprise the image within each pixel.

13. A bar code pattern for mapping a surface, said bar code comprising a sequence of parallel bars, each of said bars having one of a first and second light values, wherein a vector representation of the order of said bars, supplemented by a value representing an additional bar, is mutually orthogonal to any circular shift of said order supplemented by a value representing an additional bar.

14. The bar code pattern according to claim 13 wherein said bars whose order in said sequence is equal to the remainder of a perfect square number divided by the number of said bars in each period have said first light value, and all other said bars have said second light value.

15. The bar code pattern according to claim 13 wherein each of said bars has a substantially the same width.

16. The bar code pattern according to claim 13 wherein said sequence of bars comprises a prime number p of bars according to the formula [p=4m−1], where m is a positive integer.

17. The bar code pattern according to claim 16 wherein said prime number p is 19.

18. The bar code pattern according to claim 13, said structured light comprising 15 bars, wherein each of said bars is has one of a first and second light value, according to the sequence

++++-+-++--+--- where "+" represents the first light value and "−" represents the second light value, or any circular shift of said sequence.

19. An apparatus displaying the bar code pattern according to claim 13.

20. An apparatus for mapping a surface comprising:
an input for receiving image data representing a plurality of images of the surface, at least one of said images comprising said surface illuminated by a predetermined structured light;
means for determining the correspondence between each pixel of said image data and one or more portions of said predetermined structured light;
means for calculating a position of the portion of said surface corresponding to each pixel, from the determined correspondence, a predetermined position of a source of the predetermined structured light, and a predetermined position of the source of the images,
said determining and said calculating being carried out as a function of a stored sequence of parallel bars, each of said bars having one of a first and second light values, wherein a vector representation of the order of said bars, supplemented by a value representing an additional bar, is mutually orthogonal to any circular shift of said order supplemented by a value representing an additional bar.

21. The apparatus according to claim 20, wherein said means for determining the correspondence comprises means for calculating the inner product of a time series vector for each pixel of the image data and a time series fingerprint of each portion of the predetermined structured light.

22. A method of mapping a surface comprising:
collecting image data representing a plurality of images of the surface, at least one of said images comprising said surface illuminated by a predetermined structured light;
determining the correspondence between each pixel of said image data and one or more portions of said predetermined structured light;
calculating a position of a portion of said surface corresponding to each pixel from the determined correspondence, a predetermined position of a source of the predetermined structured light, and a predetermined position of the source of the images,
said determining and said calculating being carried out as a function of a stored sequence of parallel bars, each of said bars having one of a first and second light values, wherein a vector representation of the order of said bars, supplemented by a value representing an additional bar, is mutually orthogonal to any circular shift of said order supplemented by a value representing an additional bar.

23. The method according to claim 22, wherein determining the correspondence comprises calculating the inner product of a time series vector for each pixel of the image data and a time series fingerprint of each portion of the predetermined structured light.

24. An apparatus for generating a bar code pattern for mapping a surface, said apparatus comprising a projection device operative to project a bar code comprising a sequence of parallel bars, each of said bars being one of either light and dark, wherein a vector representation of the order of light and dark bars, supplemented by a value representing a dark bar, is mutually orthogonal to any circular shift of said order supplemented by a value representing a dark bar.

25. The apparatus according to claim 24, wherein said projection device comprises a laser emitter and a rotating reflective surface.

26. The apparatus according to claim 24, wherein said projection device comprises a mask for forming said bar code.

27. The apparatus according to claim 24, wherein said projection device comprises means for generating a video signal, and means for actively projecting said video signal.

28. A processor for mapping a surface comprising:
means for determining correspondence between each pixel of image data representing a plurality of images and one or more portions of a predetermined structured light, wherein at least one image among said plurality of images depicts said surface illuminated by said predetermined structured light, said means for determining comprising means for calculating the inner product of a time series vector for each pixel of the image data and a time series fingerprint of each portion of the predetermined structured light;
means for calculating a position of a portion of said surface which corresponds to each pixel from said determined correspondence, a predetermined position of a source of said predetermined structured light, and a predetermined position of a source of said series of images.

* * * * *